United States Patent [19]

Worthing

[11] Patent Number: 4,846,612

[45] Date of Patent: Jul. 11, 1989

[54] SANDWICH PANEL FASTENER

[75] Inventor: Albert L. Worthing, Tustin, Calif.

[73] Assignee: Shur-Lok Corporation, Irvine, Calif.

[21] Appl. No.: 109,856

[22] Filed: Oct. 19, 1987

[51] Int. Cl.⁴ .............................................. F16B 39/02
[52] U.S. Cl. ........................................ 411/82; 52/787; 411/258; 411/908
[58] Field of Search ..................... 411/23, 69, 82, 258, 411/907, 908; 52/309.2, 787

[56] References Cited

U.S. PATENT DOCUMENTS

| | | | |
|---|---|---|---|
| 3,282,015 | 11/1966 | Rohe et al. | 411/258 X |
| 3,510,916 | 5/1970 | Phelan | 52/787 X |
| 3,564,798 | 2/1971 | Darby et al. | 411/82 X |
| 3,884,006 | 5/1975 | Dietlein | 411/82 X |
| 4,212,610 | 7/1980 | Weidlich et al. | 52/787 X |
| 4,341,053 | 7/1982 | Dettfurth et al. | 411/82 X |
| 4,509,308 | 4/1985 | Dettfurth et al. | 52/787 |

OTHER PUBLICATIONS

Shur-lok Corporation, "Fasteners for Sandwich Structure", SL606 Series, Aug. 1974.
Shur-lok Corporation, "Fasteners for Sandwich Structure", SL607 Series, Apr. 1976.
Shur-lok Corporation, "Fasteners for Sandwich Structure", SL603 Series, Jun. 1985.
Shur-lok Corporation, "Fasternes for Sandwich Structure", SL602 Series, Aug. 1974.
Shur-lok Corporation, "Fasteners for Sandwich Structure", SL601 Series, Aug. 1974.
Shur-lok Corporation, "Fasteners for Sandwich Structure", SL604 Series, Aug. 1974.

Primary Examiner—Gary L. Smith
Assistant Examiner—Douglas E. Ringel
Attorney, Agent, or Firm—Price, Gess & Ubell

[57] ABSTRACT

A fastener designed to be securerd into a hole in an aircraft panel can be manufactured from an integral engineering thermoplastic structure which includes a centrally located cylindrical body carrying flanges at its ends. One of these flanges has diametrically opposed notches leading through it. Ribs are located on the flanges so that when the fastener is within a hole in a panel and a fluid resin composition is forced in to one of the notches the flow is divided into two separate streams, each of which flows in a labyrinth-like manner in reaching the other notch.

4 Claims, 3 Drawing Sheets

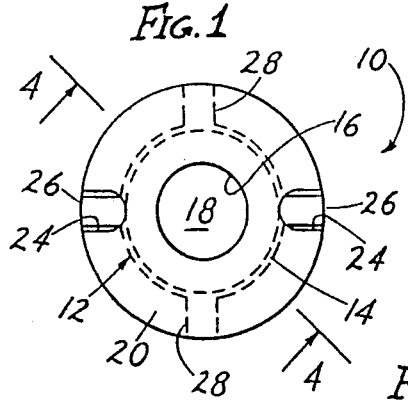
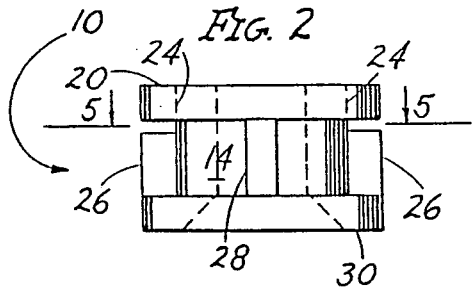
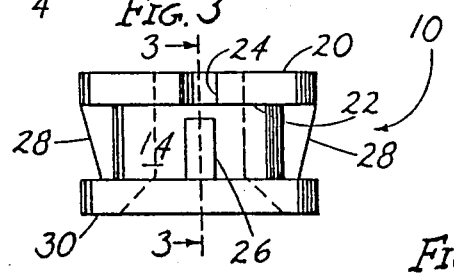
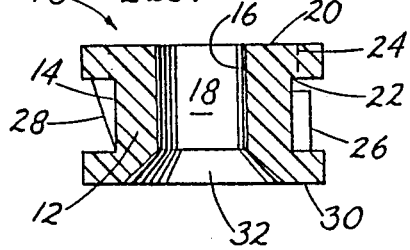
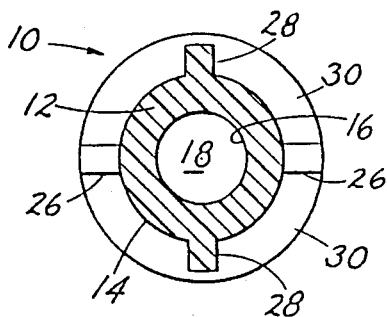
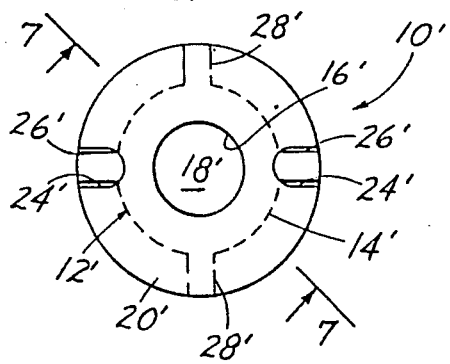
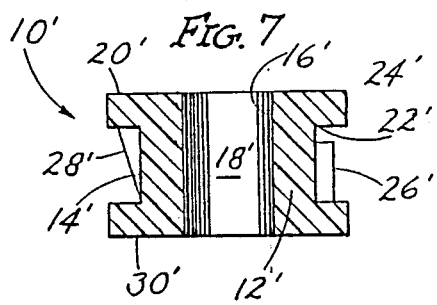

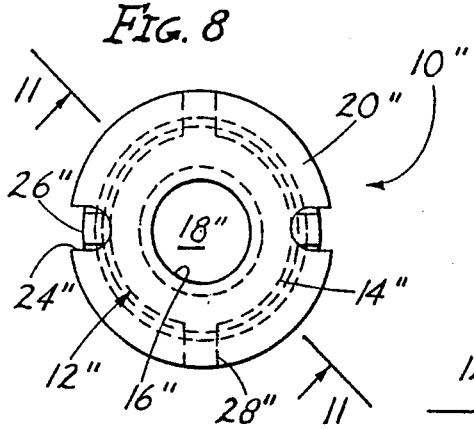
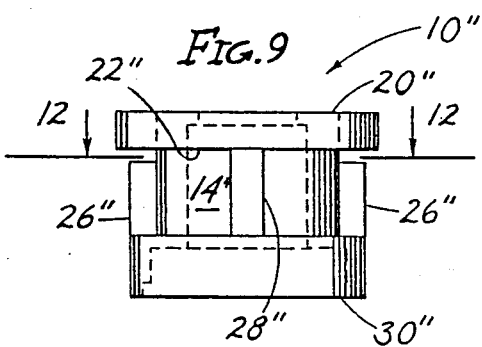
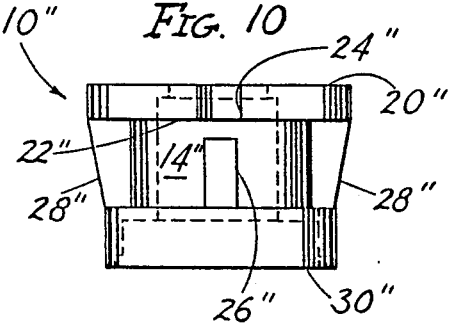
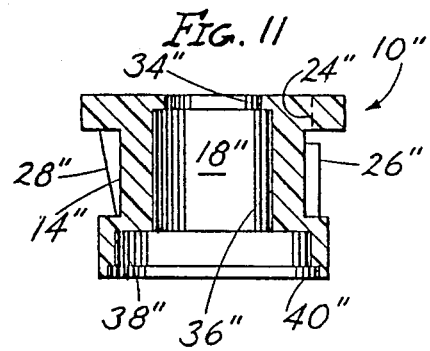
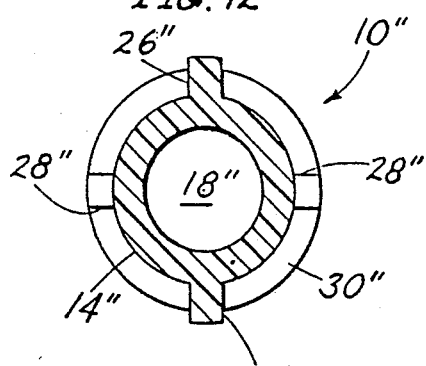
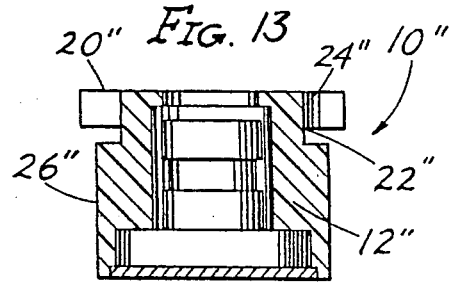

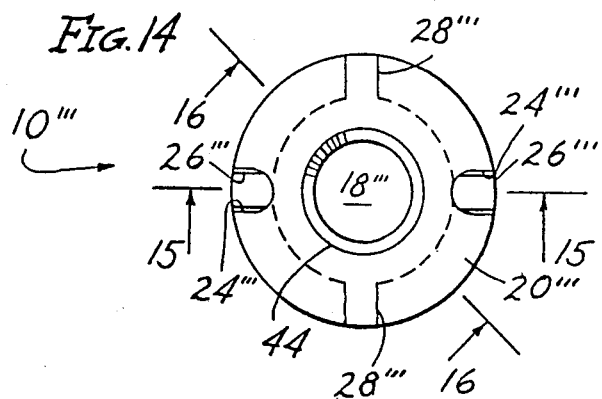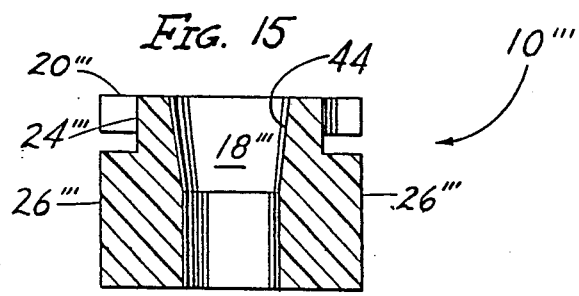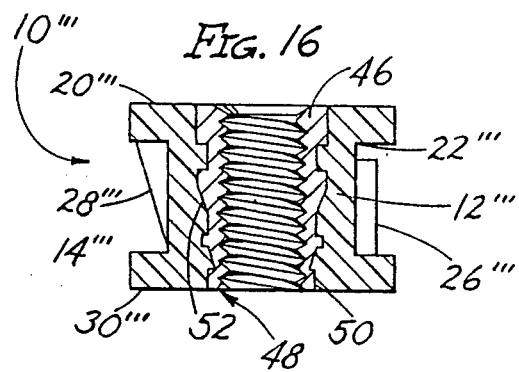

SANDWICH PANEL FASTENER

FIELD OF THE INVENTION

This invention relates to fasteners and, more particularly, to fasteners employed in sandwich type panels. The invention also relates to a method of assembling and installing a fastener into a sandwich type panel.

CROSS REFERENCE TO RELATED APPLICATIONS

This application contains subject matter common to subject matter contained in another application of the applicant, Ser. No. 083,066, filed entitled "Improved Fastener and Assembly Process". The entire disclosure of this other application is incorporated herein by reference.

BACKGROUND

Light weight panels commonly formed of a sandwich of two flat facings and an intermediate "core" structure bonded together are often used as flooring, bulkheads and the like in commercial aircraft. Such sandwich panels possess the high strength and stiffness and low weight characteristics desired in aircraft. Panels as indicated are used with known fasteners; these are affixed to these panels in a variety of ways. The fasteners permit bolts, spacers, threaded inserts and other attaching devices to be used to fasten these panels to support structures in an aircraft as well as to permit other structures and accessory equipment to be supported on and maintained in a fixed location on the aircraft floor. A large variety of fasteners for such applications have been marketed and sold by the ShurLok Company, Irvine, Calif., U.S.A., the assignee of the present invention.

SUMMARY OF THE INVENTION

In accordance with this invention the noted objectives are achieved by providing in a fastener of the type containing a centrally located, hollow cylindrical body having an interior passage extending between its ends for receiving a bolt shank; a top flange located on and extending outwardly from an end of said body; a bottom flange located on and extending outwardly from the other end of said body, the improvement comprising: said top flange containing a pair of opening means located in diametrically opposed positions along the periphery of said flange, a first pair of rib means, each of said rib means of said first pair having a top and a bottom end, said rib means of said first pair being located in diametrically opposed positions along the exterior of said body and being attached to the exterior of said body, said rib means of said first pair extending between and being attached to said top and bottom flanges, a second pair of rib means, said rib means of said second pair being located in diametrically opposed positions along said body portion and being equally spaced from said rib means of said first pair, each of said rib means of said second pair having a top and a bottom end, said bottom ends of said rib means of said second pair extending upwardly from and being attached to said bottom flange and having the top ends thereof located beneath and spaced from said opening means, said rib means of said first and second pairs being shaped so as to divide a flow of a liquid polymer composition into one of said opening means into two streams and to cause such streams to separate and flow along labyrinth type flow paths in order to reach the other of said means when said fastener is located within a panel with said flanges being adjacent to the surfaces of said panel; and said rib means of both of said pairs, said flanges and said body being integral with one another and being formed of an engineering polymer material.

The foregoing objects and advantages of the invention together with the structural characteristics of the invention, which have been only briefly summarized in the foregoing passage, will become more apparent to those skilled in the art upon reading the detailed description of preferred embodiments of the invention, which follows in this specification, together with the illustrations thereof presented in the accompanying drawings.

BRIEF DESCRIPTION OF THE DRAWINGS

In the drawings:

FIGS. 1, 2, and 3 illustrate an embodiment of a fastener of the invention in a top plan view, front elevational view, and a left side elevational view, respectively, of a presently preferred fastener in accordance with this invention;

FIG. 4 is a sectional view taken along the second line 4—4;

FIG. 5 is a sectional view taken along the section lines 5—5 in FIG. 2;

FIG. 6 is a top plan view of an alternative embodiment of the invention;

FIG. 7 is a sectional view taken along line 7—7;

FIGS. 8, 9, and 10 are a top plan view, a front elevational view, and a left side view, respectively, of a third embodiment of a fastener of the invention;

FIG. 11 is a sectional view taken along the section lines 11—11 in FIG. 8;

FIG. 12 is a sectional view taken along the lines 12—12 in FIG. 9;

FIG. 13 is a view which is similar to FIG. 11 of the fastener shown in FIGS. 8, 9, and 10 in use with an inset nut;

FIG. 14 is a top plan view of still another embodiment of the invention;

FIG. 15 is a sectional view taken along the section line 15—15 in FIG. 14; and

FIG. 16 illustrates a section view of the embodiment of FIG. 14 taken along the lines 16—16 in FIG. 14 modified so as to include a threaded metal insert.

DETAILED DESCRIPTION OF THE PREFERRED EMBODIMENTS

Reference is made to FIGS. 1, 2, and 5 in which there is illustrated a "through hole" type fastener or bolt spacer 10 in accordance with the invention. As illustrated in FIG. 1, the fastener 10 contains a central tubular body 12 having a cylindrical outer peripheral surface 14, and a coaxial cylindrical inner wall 16 defining a central, generally cylindrical passage 18. An essentially washer-like shaped flange 20 is integrally attached to the upper end 22 of the body 12 and contains cutaway openings or notches 24 located on diametrically opposite edges (not numbered) of the flange 20.

The notches 24 serve as openings through the flange 20 which are sufficiently large to expose or overlie radially directed, diametrically positionally opposed, identical upstanding ribs 26 which underlie and are spaced from the flange 20 and notches 24. An additional pair of identical upstanding ribs 28 are located diametrically opposite one another. The four ribs 26 and 28 are preferably spaced evenly about the central axis (not shown) of the fastener 10 at intervals of 90 degrees to facilitate manufacture and to simplify tooling.

As will be apparent in FIGS. 2 to 5, the fastener 10 contains a second washer-like flange 30 of the same diameter as the flange 20 located at the bottom end of the body 12. This second flange 30 of the same diameter and thickness as the flange 20 and extending parallel to the flange 20 is integrally connected to the body 12. The ribs 26 and 28 are also integrally connected to outer surface 14 of the body 12. The ribs 26 and 28 are also integrally connected to the flange 30. The ribs 26 are spaced a short distance from the flange 20. As opposed to this the ribs 28 are tapered; they are largest adjacent to the flange 20. As illustrated in FIG. 4 the central passage 18 contains a flared surface 32 of a frustoconical shape in the flange 30.

In order to obtain all of the advantages of this invention the body portion 12, the flanges 20 and 30, and ribs 26 and 28 defining the structure must be integral. They must also be formed of an engineering thermoplastic material. Specifically the preferred material is an engineering thermoplastic having the characteristic of high strength, heat and corrosion resistance, non-toxicity, non-flamability and creep-resistance desired in a fastener. Since such compositions are known it is not considered necessary to more fully discuss them in this discussion. The fastener 10 may be easily formed of such a material by common molding procedures. It is considered important to note that the precise shape of the fastener 10 is quite important in making it possible to mold this fastener 10 both rapidly and inexpensively. This fastener 10 is designed so that it can be manufactured using "straight pull" dies not containing cores or undercuts by making the mold parting line correspond to the dotted line 3—3 in FIG. 3 of the drawing.

With the invention the ability to use such relatively inexpensive dies is achieved in the production of a fastener, specifically the fastener 10 which is shaped so that as a resin or polymer mixture is used with it the resin will be divided into two separate streams and then these separate streams will be caused to flow in a labyrinth-like manner around the entire tubular body 12. This manner of resin flow during the use of the fastener is best more fully explained by referring directly to the use of a fastener 10. When it is to be used, the fastener 10 of FIG. 1 is assembled in a hole or opening in a sandwich type panel (not illustrated) in a conventional manner. Preferably the dimensions of the fastener 10 are such that it is of the same height as thickness of the panel. After such insertion an epoxy resin or equivalent potting composition is then injected through one notch 24 (not separately numbered) into the space (not separately numbered) defined by the interior of the hole, the flanges 20 and 30, and the core 12 to fill all of the interstices of this space.

The resin is normally injected in this manner until an excess of it exits through the other notch 24 (not separately numbered) after being divided into two streams and after each of these streams has been caused to flow in a labyrinth-like path. The latter is considered to be important in getting the previously noted space completely filled with the resin. The tapered shapes of the ribs 28 are believed to be important in connection with this filling. The excess resin is usually removed from the flange 20 and then the resin is allowed to cure or harden. Upon curing the resin forms a firm bond between the panel and the fastener 10 which holds the fastener 10 securely in place.

Although the steps of injecting resin in a prior related fastener and allowing it to set up are old and are described in appropriate literature, the fastener 10 and the manner of using it differ from such prior related fasteners. Definite advantages are achieved by the use of a polymer in the fastener 10. The spacing between the ribs 26 and 28 and the flange 20 is such as to facilitate passage of such a resin as noted. Further, the shape of the ribs 28 has been developed so as to accomodate resin flow past them as a fastener 10 is being installed as described. The use of the labyrinth type resin flow paths as described is considered desirable in avoiding any possibility of air pockets being present around the fastener 10 after the latter has been installed.

After a fastener 10 has been installed in a panel as described, a bolt (not shown) is usually extended through the central passage 18 in the fastener 10 in a known manner. In this particular embodiment, the fastener 10 is designed to receive a bolt head (not shown) which is tapered on its underside and which seats within the flared surface 32 of the fastener 10. The arrangement appears resistant to torque and satisfies needs addressed by shear force levels.

In some applications, it is not necessary to provide a seat for a bolt head. Accordingly, in a fastener 10' corresponding to the fastener 10 the central passage 18 of the fastener 10 may be a straight cylinder and the flared surface 32 omitted, as illustrated in FIGS. 6 and 7. Because the elements or parts of the fastener 10' illustrated in FIGS. 6 and 7 are essentially identical in geometry and construction to the elements or parts of the fastener 10, it is not necessary to describe all such elements or parts since they have been previously described in connection with the fastener 10. To distinguish between the two fasteners 10 and 10', all parts shown in FIGS. 6 and 7 are identified by the primes of the numbers previously used. The only difference in the fasteners 10 and 10' is that the passage 18' is a straight cylinder to provide for insertion use of a shank of a bolt (not shown).

An alternative embodiment of the invention is a blind type or blind fastener 10" as shown in FIGS. 8 to 12. Since the fasteners 10 and 10" are quite similar in the interests of brevity the elements or parts of the fastener 10" are identified by double primes of the numerals used for the corresponding elements or parts of the fastener 10. As shown, the fastener 10" contains a body 12" having a cylindrical surface 14"; a central passage 18"; a flange 20"; a bottom flange 30"; notches 24" in top flange 20"; ribs 26" located under the notches 24" and other ribs 28".

As observed in FIGS. 9 and 10, the flange 30" is of a smaller diameter than top flange 20", whereas in the embodiment of FIG. 1, these flanges 20 and 30 are of essentially the same diameter. Also the thickness of flange 30" is greater than in the preceding embodiment and the overall height of the fastener is greater than the fastener 10. As illustrated in the section view of FIG. 11, the internal passage 18" is of a complex shape representing a series of cylinders of hollow, axially aligned different diameters. This includes a cylinder 34" of a first diameter, a second cylinder 36" of a slightly larger diameter, a shorter cylinder 38" of a still larger diameter and a very shallow disk-shaped cylinder 40."

The fastener 10" is intended to be used with a conventional nut element within the passage 18" in which corresponding nut elements have previously been used with prior related fasteners (not shown). This is depicted in FIG. 13 in which the nut element is seated within the cylinders. A disk type seal 42 is bonded into place in the cylinder 40 in a known manner to hold the nut element in place. Preferably the disk 42 is of a metal such as titanium. The fastener 10" is assembled and fixed within a sandwich type panel (not shown) and used in essentially the same manner as indicated in the preceding. In use a bolt shank (not illustrated) is normally threaded into the nut element.

The advantages of the non-corrosive fastener 10 of the invention are extended further in a fastener 10''' shown in FIGS. 14, 15 and 16 which is used in substantially the same manner as the fasteners 10, 10', and 10", previously described. For convenience, the elements or parts of the fastener 10''' which are common to fastener 10 are identified by triple primes of the same numerals previously used and are not separately described herein.

This fastener 10''' is not really a completed fastener although it is capable of being used as such. The central passage 18''' in it contains a gradually tapered frustoconical portion 44 which extends approximately midway along the length of the passage 18'''. The remainder of the passage 18''' is cylindrical. This passage 18''' is designed so as to receive and hold an internally threaded metal insert 46 which extends the length of the passage 18'''. The outer surface 48 of this insert 46 includes a series of rings and tapered serrations 50 and 52, respectively, which are much like the external configuration of a metal wall anchor. These rings 50 and serrations 52 are designed so as to prevent removal of the insert 46 from the body 12''' under a pulling force. Preferably the insert 46 is wider adjacent to the flange 20''' than adjacent the flange 30''' so as to facilitate its assembly within the fastener 10''' by the use of ultrasonic heating.

Although the insert 46 can be installed by inserting it in a die as the fastener 10''' is injection molded, it is preferred for economic reasons to install it within the fastener 10''' after the latter has been molded by pressing the insert 46 into the passage 18''' while applying ultrasonic energy to the insert. When this is done the ultrasonic energy softens the body 12''' adjacent to the passage 18''' so as to allow the insert 46 to move axially to its final location as shown within the passage 18'''. After the ultrasonic energy is withdrawn the thermoplastic material hardens so as to firmly anchor the insert 46 in place. The conical portion 44 aids in positioning the insert 46 during assembly in this manner and reduces the amount of plastic material which must be moved as the space is taken up by the insert 46.

It is believed that the foregoing description of the invention is sufficient in detail to enable one skilled in the art to make and use the invention. However, it is to be understood that the details of the elements which have been set forth for this enabling purpose are not intended to limit the scope of the invention in as much as various equivalents may, on occasion, be substituted for such details. Such equivalents will be apparent to those skilled in the art from a consideration of this specification and the drawings. Because of this the invention is to be broadly construed within the full scope of the appended claims.

What is claimed is:
1. In a fastener of the type containing a centrally located, hollow cylindrical body having an interior passage extending between its ends for receiving a bolt shank,
a top flange located on and extending outwardly from an end of said body,
a bottom flange located on and extending outwardly from the other end of said body,
the improvement comprising:
said top flange containing a pair of opening means located in diametrically opposed positions along the periphery of said flange,
a first pair of rib means, each of said rib means of said first pair having a top and a bottom end, said rib means of said first pair being located in diametrically opposed positions along the exterior of said body and being attached to the exterior of said body, said rib means of said first pair extending between and being attached to said top and bottom flanges,
a second pair of rib means, said rib means of said second pair being located in diametrically opposed positions along said body portion and being equally spaced from said rib means of said first pair, each of said rib means of said second pair having a top and a bottom end, said bottom ends of said rib means of said second pair extending upwardly from and being attached to said bottom flange and said top ends thereof located beneath and spaced from said opening means,
said rib means of said first and second pairs being shaped so as to divide a flow of a liquid polymer composition into one of said opening means into two streams and to cause such streams to separate and flow along labyrinth type flow paths in order to reach the other of said opening means when said fastener is located within an opening in a panel with said flanges being adjacent to the surfaces of said panel; and
said rib means of both of said pairs, said flanges and said body being integral with one another and being formed of an engineering polymer material.
2. A fastener as defined in claim 1 wherein:
each of said opening means is a notch found in the periphery of said top flange.
3. A fastener as defined in claim 2 wherein:
said rib means of said first pair of ribs are tapered so as to have their largest dimension adjacent to said top flange.
4. A fastener as defined in claim 1 wherein:
each of said opening means is a notch found in the periphery of said top flange,
said rib means of said first pair of ribs are tapered so as to have their largest dimension adjacent to said top flange,
said ribs of said pairs of rib means being located 90° apart around the axis of said body and said notches extending radially into said top flange so as to enable said fastener to be molded using straight parallel dies,
said rib means of said first and said second pairs of ribs define said labyrinth-like flow paths,
said flow paths being identical so as to have the same resistance to resin flow when said fastener is located as specified in claim 1.

* * * * *